United States Patent [19]

Huvey

[11] Patent Number: 5,659,941
[45] Date of Patent: Aug. 26, 1997

[54] PROCESS FOR MANUFACTURING A LIGHT STRUCTURE THROUGH THE EXPANSION OF A METALLIC TANK IN AN ARMORED CORRUGATED PIPE

[75] Inventor: Michel Huvey, Bougival, France

[73] Assignee: Institut Francais du Petrole, Rueil Malmaison, France

[21] Appl. No.: 165,460

[22] Filed: Dec. 13, 1993

Related U.S. Application Data

[63] Continuation of Ser. No. 829,292, Feb. 3, 1992, abandoned.

[30] Foreign Application Priority Data

Feb. 1, 1991 [FR] France ............... EN.91/01.193

[51] Int. Cl.$^6$ .................................... B23P 17/04
[52] U.S. Cl. .............................. 29/421.1; 29/523
[58] Field of Search ................. 29/421.1, 522.1, 29/523

[56] References Cited

U.S. PATENT DOCUMENTS

| | | |
|---|---|---|
| 1,651,521 | 12/1927 | Girardville . |
| 2,779,279 | 1/1957 | Maiwurm ............... 29/523 X |
| 2,988,240 | 6/1961 | Hardesty . |
| 3,064,344 | 11/1962 | Arne .................. 29/523 X |
| 3,200,998 | 8/1965 | Mahar . |
| 3,203,845 | 8/1965 | Short . |
| 3,207,352 | 9/1965 | Reinhart, Jr. . |
| 3,335,903 | 8/1967 | Anderson . |
| 3,400,849 | 9/1968 | Pottier et al. . |
| 3,508,677 | 4/1970 | Laibson et al. . |
| 3,765,557 | 10/1973 | Giwer . |
| 3,776,409 | 12/1973 | Pearson . |
| 3,844,730 | 10/1974 | Laussermair ............ 29/523 X |
| 3,851,786 | 12/1974 | Kaempen . |
| 3,874,544 | 4/1975 | Harmon . |
| 4,018,333 | 4/1977 | Blackwood . |
| 4,191,304 | 3/1980 | Schiedat . |
| 4,349,463 | 9/1982 | Flanigen . |
| 4,377,894 | 3/1983 | Yoshida .............. 29/523 X |
| 4,391,301 | 7/1983 | Pflederer . |
| 4,785,956 | 11/1988 | Kepler et al. . |
| 5,020,358 | 6/1991 | Sharp . |

FOREIGN PATENT DOCUMENTS

| | | |
|---|---|---|
| 2553860 | 10/1983 | France . |
| 2669396 | 11/1990 | France . |
| 1161846 | 7/1967 | United Kingdom . |

*Primary Examiner*—Joseph M. Gorski
*Attorney, Agent, or Firm*—Antonelli, Terry, Stout & Kraus, LLP

[57] ABSTRACT

A process for manufacturing high-pressure tanks of low weight with an armored corrugated metal sheath, a corrugated pipe is circumferentially armored, with the metallic tank being introduced into the armored corrugated pipe. An assembly which includes the armored pipe and the tank is longitudinally armored except for oppositely disposed openings of the pipe and the metallic tank. The material of the metallic tank is caused to creep through plastic deformation under an effect of an internal pressure in order to obtain a corrugation of the cylindrical part of the metallic tank.

10 Claims, 1 Drawing Sheet

PROCESS FOR MANUFACTURING A LIGHT STRUCTURE THROUGH THE EXPANSION OF A METALLIC TANK IN AN ARMORED CORRUGATED PIPE

This is a continuation of application Ser. No. 829,292 filed Feb. 3, 1992, abandoned.

BACKGROUND OF THE INVENTION

The present invention relates to a process for manufacturing a resistant metallic tank capable of withstanding high pressures and exhibiting a low unitary weight.

The process described in the present invention enables manufacturing of a light structure at a low cost price and with a fast achievement, and it allows an easy adaptation of the structures or self-adaptation.

This process is applied to a tank whose inner sheath consists of a metallic pipe.

Patent application FR-90/14,490 describes a process for manufacturing a metallic tank laid out in order to gain a relative lightness while keeping a compressive strength identical to or higher than the resistance of conventional tanks.

Manufacturing such tanks requires a very heavy mold and therefore considerable investments, with each mold being specifically adapted to a given structure, and the manufacturing time is also relatively long.

Another process consists in using metallic strips and in helically winding the metallic strips in order to obtain a corrugated cylindrical zone. This operation has the disadvantage of being very slow.

SUMMARY OF THE INVENTION

The process described according to the present invention avoids a large part of these drawbacks.

The main idea which is developed in the present invention consists in using a reinforced thermoplastic pipe, previously described in patent FR-2,553,860, as a mold for corrugating a metallic tank, with the pipe and the mold thereof remaining imbricated in one another after manufacturing, and the metallic tank being located inside the mold.

The original material is thus the basic corrugated pipe, easily available with various corrugation shapes and inexpensive if it is a thermoplastic pipe, but extremely costly if it is a metallic pipe.

The gain obtained with the invention results from the fact that it is no longer necessary to use preformed metallic corrugated pipes obtained through conventional manufacturing means.

In fact, thermoplastic pipes of selected length, more easily modulable according to the required structure and less costly than the molds usually utilized to form metallic tanks, which are less flexible as far as adjusting is concerned, can be manufactured.

The process described hereafter also has the advantage of allowing a self-adapting of the shapes of the tank to the future use thereof, thereby giving it a maximum resistance.

The structure constituted therewith according to our invention has the advantage of having a unitary weight ranging between one-half and one-sixth of the weight of conventional steel tanks while keeping a compressive strength identical to that of bottles of conventional technology.

The process for manufacturing the tank according to the present invention comprises the following steps in combination:

achieving a corrugated pipe, such as a thermoplastic pipe, substantially cylindrical, with a length adapted to the final structure, circumferentially reinforcing the pipe by fitting over at least part of the height H thereof the hollow outer portions of said substantially cylindrical corrugated pipe with a circumferential reinforcing element, placing inside the pipe armored or reinforced therewith a cylindrically hemispherical or a cylindrically ellipsoidal metallic tank provided with a cylindrical zone whose length and diameter correspond to the length of said armored corrugated pipe, d) depositing on the outside of the assembly consisting of the armored pipe and the metallic tank, except for the openings, a means for withstanding the longitudinal traction or longitudinal reinforcement, e) causing the material of the metallic tank to creep through plastic strain under the effect of an internal pressure so that it takes a shape allowing it to withstand the pressure by resting on the circumferential reinforcement of the corrugated pipe and the longitudinal reinforcement deposited in stage d).

The step of circumferentially reinforcing the pipe may be performed during the manufacturing of the tank, or independantly, on a continuous thermoplastic pipe which is cut out thereafter to the length corresponding to the cylindrical zone to be created.

According to preferred embodiment procedures, among which some can be achieved simultaneously:

the metallic tank used is made of a metal of high plastic elongation. Stainless steel, conventional steel or a light alloy can for example be used, the circumferential reinforcing element can be a fiber-reinforced stabilizable resin; in this case, the pipe armored therewith is subjected over at least part of the length thereof to a treatment allowing to stabilize the stabilizable composition, the resin is, for example, a photocurable resin and the stabilizing stage is achieved by exposing said assembly to an ultraviolet ray lamp.

The resin is, for example, a heat convertible resin and the assembly is kept in the stabilizing stage under conditions allowing the cross-linking to take place.

The resin is, for example, a thermosetting resin and the stabilization is achieved by heating the assembly up to a temperature allowing the resin to harden.

The means for withstanding the longitudinal traction or longitudinal reinforcement of the cylindrical zone, which also support the bottoms, are made up of fibers deposited on the outer structure of the tank by helicoid or polar winding, and/or of a braid lodged on the outer structure of the tank.

The longitudinal traction or longitudinal reinforcement may, for example, consist of an aramid wick impregnated with a thermoplastic elastomer, with the ends of the wicks being fastened with gluing points to the pole of the tank.

After the step of circumferentially reinforcing the pipe, a sheath made of a material substantially non permeable to the resin, in order to hold it substantially in place in the hollow outer portions of the corrugated pipe, may for example be deposited before starting the step of depositing the longitudinal traction or longitudinal reinforcement. The stabilizing treatment can thus be carried out after the winding stage and before the stage of shaping of the metal or creep. The sheath that has been possibly deposited can be a simple helicoid winding of a plastic or elastomeric material strip whose thickness can be low since this strip normally no longer plays any part after the resin has hardened.

At least one end of the tank is fitted with a system allowing communicates with the outside or to provide a tight closing.

It is possible to fit the outer part of the tank obtained thereby with a protective layer, for example by spraying a thermoplastic elastomer solution after the stage during which the longitudinal reinforcement is deposited.

In order to reinforce the protection of the tank, it can be placed in a protective jacket consisting, for example, of a corrugated cardboard container, with the space between the container and the tank being filled with a phenolic resin-based expansible composition.

The tank obtained with the manufacturing process described above is made up of a metallic internal sheath consisting of two bottoms separated by a corrugated cylindrical body or zone and fastened to the cylindrical body, with bottoms being provided with at least one opening and with closing means or means for communicating with the outside which means may, for example, be valves or a stopper and a valve, and means for withstanding the longitudinal traction. It is characterized in that the metallic inner sheath of the cylindrical zone comprises corrugations, with the winding curves of said cylindrical zone having preferably a circumferential shape.

The tank can notably be used for stocking fluid under pressure.

The longitudinal reinforcement may consist of fibers disposed in such a way that the fibers run around the poles of the bottle, or polar winding, or of a braid lodged on the outer structure of the tank.

BRIEF DESCRIPTION OF THE DRAWINGS

Other objectives, features, details and advantages of the invention will be clear from reading the description hereafter, with reference to the accompanying drawings given by way of example, and illustrating various embodiment procedures of the invention, in which.

DESCRIPTION OF THE PREFERRED EMBODIMENTS

Implementing the process comprises using a reinforced mold obtained by implementing the circumferential armoring method described in French patent application 90/14,490.

Figure 1:
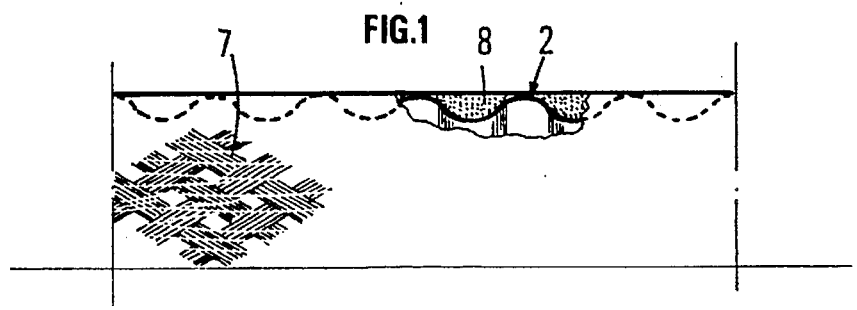
FIG. 1 shows a mold with a reinforced corrugated wall which will be used for shaping the metallic tank.

FIG. 1 shows an armored cylindrical corrugated pipe 2 which will serve as a mold for shaping the metallic tank, with the tank being made of a thermoplastic material. The outer surface of the pipe 2 must have a shape enabling the obtaining of the required final corrugation.

A corrugated pipe made of polypropylene can; for example, be used.

The longitudinal reinforcement 7 is set in place, as will be described more fully below, after assembling the metallic tank to be shaped in the mold.

Figure 2:
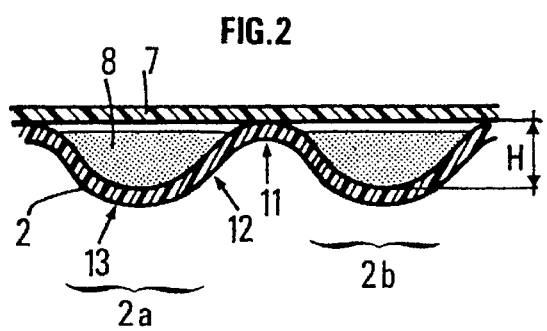
FIG. 2 shows a portion of the corrugated cylindrical zone of the mold shown in FIG. 1.

More precisely, FIG. 2 shows the portion of said armored corrugated cylindrical pipe constituting the mold. The method allowing to obtain such a structure is described in French patent application 90/14,490. It comprises a circumferential armoring operation which consists in filling the hollow portions $2a$, $2b$ of the corrugated pipe with a fiber-reinforced resin 8, followed by a stage of stabilization treatment of the composition comprising reinforcing fibers.

The features given hereafter are merely intended to convey the characteristics which have already been described in patent application FR-90/14,490.

The axial section of the corrugated pipe is made up of successive circle portions 11, with 13, these circle portions 11, 13 can being either separated or not by substantially rectilinear portions 12 illustrated by a cross-sectional view, and corresponding to substantially conical zones in a spatial representation.

The shapes constituted by the successive hollow and embossed portions can form successive rings or take a helicoidal shape.

A structure of the "accordion" type can be used without departing from the scope of the present invention. In this case, the hollow portion can be filled substantially over the total length thereof. In the same way, the corrugation can be sinusoidal or similar.

In the following description, what is called circumferential armoring is the operation which allows a depositing of the circumferential reinforcing element into the outer hollow of the pipe corrugations, and what is called longitudinal armoring is the operation by which the means for withstanding the longitudinal traction are deposited.

Figure 3:
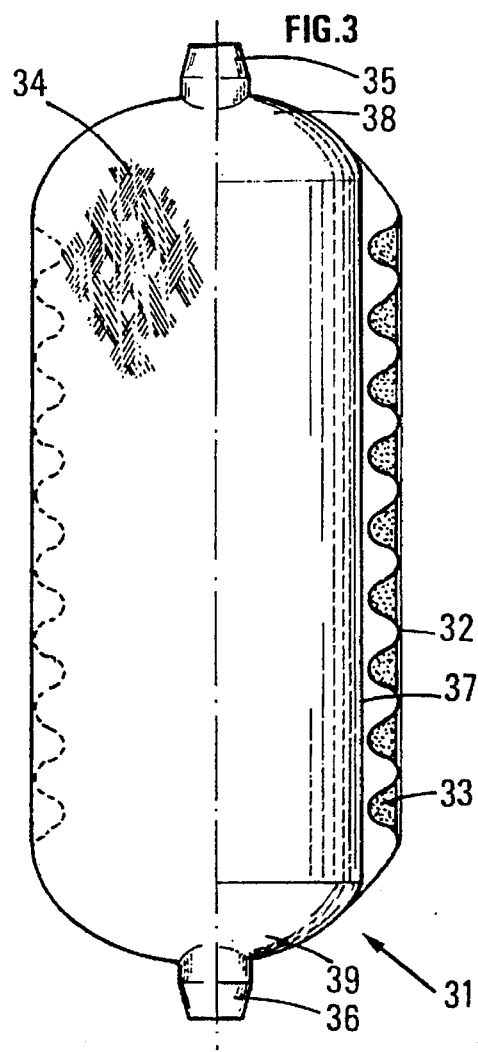
FIG. 3 shows the lay-out of the elements during the manufacturing process.

FIG. 3 shows the lay-out of the various elements used to obtain the hollow structure whose internal sheath is made of metal with the method described further on in this patent.

According to the process of the invention, two independant structures are used: a metallic structure 31, or tank, and a structure made up of a piece of an armored thermoplastic corrugated pipe 32, such as pipe 2 in FIG. 2 described previously.

One possibility to obtain the metallic structure or tank 31 consists in associating a smooth metallic thin pipe 37 and two hemispherical bottoms 38, 39 of equal thickness.

Bottoms 38 and 39 have an ellipsoid or a hemispherical shape.

The tight sheath of bottoms 38, 39 can be advantageously of the same nature as the one of metallic pipe 37 which constitutes the cylindrical zone of the tank, although it may be of a different nature. Using products of the same nature for the sheath intended for the bottoms and the one for the metallic pipe allows to obtain a caulk weld having mechanical qualities equivalent to those of standard length.

Bottoms 38, 39 can be achieved by stamping, thermoforming, injection or by any other usual method.

The extreme zones of the tank are thereafter equipped with a valve 35 and a stopper 36 such as those standardized for stocking liquefied gases or compressed gases.

The ends of the tank can also be equipped with two valves. There can also be one valve at one end, the other one being totally smooth.

A cylindrical metallic tank whose outside diameter is preferably very slightly smaller than the inside diameter of the armored corrugated pipe is used.

The structure 32 described above is used as a mold. It is for example constituted of a piece of an armored thermoplastic corrugated pipe 32.

The metallic tank 31 and the armored corrugated pipe 32 are assembled thereafter, and the armored corrugated pipe 32 surrounds the metallic tank 31 over the major part of the length of the cylindrical part thereof.

The stabilizing treatment of the resin used to bind the fibers, the assembly constituting the circumferential reinforcement of the thermoplastic pipe, can be performed after assembling the two structures.

The assembly formed by the tank and the armored corrugated pipe is provided with a resistance to the internal longitudinal pressure, by armoring the assembly longitudinally, by depositing a longitudinal reinforcement 34 on the outside of said assembly, except for the openings.

The longitudinal armoring operation is carried out as follows.

The assembly constituted by the tank and the armored corrugated pipe 32 is positioned onto a winding machine by means of which the longitudinal reinforcement 34 is deposited.

The longitudinal reinforcement 34 can consist of fibers deposited on the structure by polar winding or of a braid placed on the tank.

One function of the longitudinal reinforcement 34 is to allow the structure to withstand the longitudinal traction at the time of the pressurization of the metallic tank during the forming operation.

The longitudinal reinforcement may be a 0.2-mm thick polyaramid layer (Kevlar or Twaron) preimpregnated with a partly hydrogenated thermoplastic elastomer of the Styrene-Isopropene-Styrene type.

The wicks deposited thereby are stuck onto the ends of the tank by adding some drops of an elastomer solvent; the solvent may be trichloroethylene.

Any other means providing a reliable fastening of the wicks can be utilized.

The assembly consisting of the tank and the armored corrugated pipe, fitted and longitudinally armored, being constructed, the forming operation or creep of the metallic inner sheath is carried out. To that end, one of the valves of the tank is connected with pressurization means.

These means can be, for example, a source of water under pressure whose pressure is progressively increased.

The behavior of the material constituting the metallic sheath or metallic structure during the forming operation is described in the following example by means actual parameters.

During this operation, the fluid feed is performed under pressure at a constant flow rate. A fast pressure build-up, up to the yield limit of the metal, is first observed.

In case of a tank consisting of a 1-mm thick and 240-mm diameter steel plate, with a 5000-bar elastic resistance and a 6000-bar tensile strength, the yield strength is reached when the pressure ranges around 40 bars.

Beyond the value of the yield strength, the pressure rises slowly and the steel plate goes simultaneously out of shape and takes the form of the corrugated pipe over the total length of the cylindrical part. The steel plate then rests or leans against the longitudinal reinforcement at the level of the bottoms.

The connecting zone, i.e. the zone located between the hemispherical bottoms and the cylindrical part of the tank, takes the mechanically most stable shape by self-adapting.

During the forming process (P>40 bars) and until the end of this process, the steel plate gets considerably thinner. The end of the forming process corresponds to a pressure value ranging around 600 bars.

The thickness of the formed steel plate is about 1 mm in the bottom zone, and 0.4 mm in the cylindrical zone where the steel follows the exact shape of the circumferential reinforcement.

Structure 32 or the corrugated thermoplastic pipe which has served as the original mold creeps while serving as a lubricant during the forming phase. It is stuck between the expanded metal and the composite reinforcement.

The tank obtained with this process is characterized by a bursting pressure of 900 bars, and a commonly used internal pressure of 300 bars, which corresponds to a bursting pressure eighteen times as high as the bursting pressure of the original product, for example, the metallic tank.

A tank whose mass is 2.1 kg is thus obtained, which corresponds to about a third of the mass of a conventional tank (6 kg) for the same capacity, while keeping the same bursting pressure behaviour. The bursting pressure of this tank is higher than 0.6 MPa.

Figure 4:
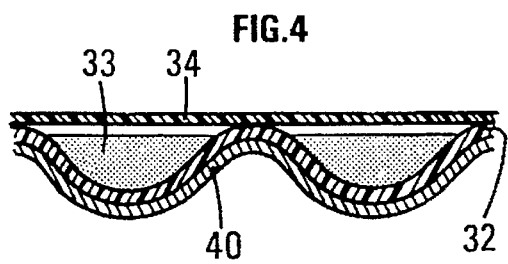
FIG. 4 is a partial view of the wall of the metallic tank after the shaping thereof.

FIG. 4 shows more precisely a part of the metallic tank obtained after forming with the process described above.

The metallic tank 37, smooth in the cylindrical part thereof, has taken a corrugated shape 40, the corrugated thermoplastic pipe 32 which has served as a mold is stuck between the corrugated wall of the metallic tank and the circumferential reinforcements 33.

During the creep operation, the thermoplastic pipe has crept. Its thickness is therefore no longer homogenous over the total length thereof, it may also exhibit zones where it has practically disappeared. This is not important since it no longer plays any part.

Numeral 34 stands for the longitudinal reinforcement deposited on the total tank obtained with the manufacturing process described in this patent.

Figure 5:
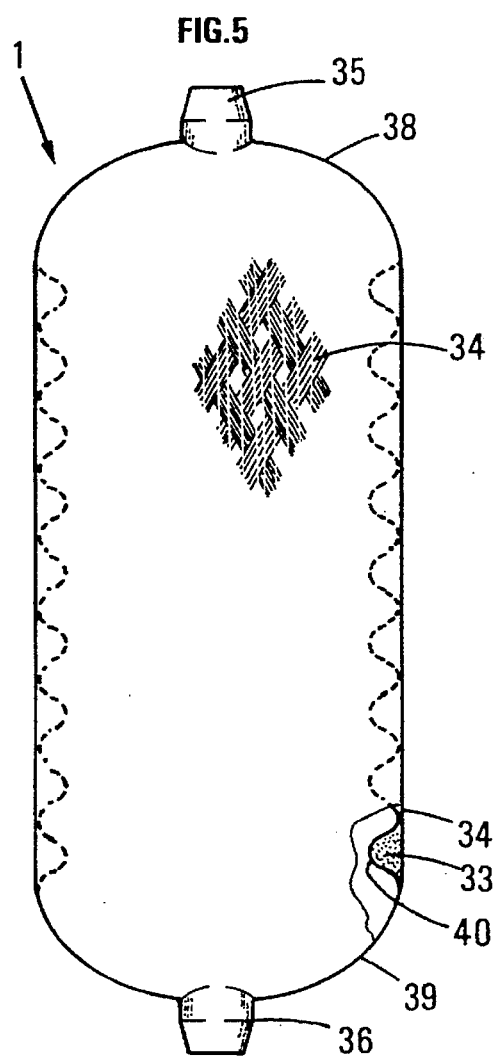
FIG. 5 shows a light structure or tank such as obtained according to the invention.

FIG. 5 shows a light structure or tank 1 obtained through the manufacturing process described above. It is made up of a corrugated metallic sheath 40, two bottoms 38, 39 located at the ends of the cylindrical zone, with the bottoms being equipped with two valves 35, 36 located at the ends of the tank 1, and means 34 for withstanding the longitudinal traction or longitudinal reinforcement. Numeral 33 stands for the circumferential reinforcement.

The function of the longitudinal reinforcement is to reproduce the bottom effect of the cylindrical or tubular part of the tank. The presence of said reinforcement on the bottoms 38, 39 enables a decreasing in the thickness of the bottoms 38, 39 and therefore to lighten the structure.

It is possible to install an additional protection by placing the tank contituted thereby in a container, for example, made of corrugated cardboard, and to fill the space between the container and the tank with a foam showing a good behaviour in case of a fire, for example an expansible composition based on a phenolic resin or any other material fulfilling the same purpose.

The assembly consisting of the container and the material constitutes a protective jacket against shocks and against the heating of the assembly.

Besides, this lay-out facilitates the transportation and the storage of the tank.

Stabilizable compositions which have already been described in the previous patent application FR-90/14,490 can also be utilized without departing from the scope of the invention. A stabilizable composition containing fibers, a glass fibers-epoxy resin thermosetting prepreg with a 50%/

50% proportion by volume or a ribbon of glass fibers impregnated with a 2-mm wide and 0.35-mm thick polyamide 12 can for example be used. In this case, the treatment suited to each one to allow the resin to stabilize will be carried out.

The invention is not limited to the use of any particular thermosetting resin. It is for example possible to mix a resin with the hardener thereof in order to impregnate the filaments which will be used for filling the hollow outer portions of the corrugated pipe, and heat thereafter. A vulcanization can also be achieved by fitting the winding curves of the previously impregnated filaments with latex to which sulfur has been added.

It is also possible to use a phenol-formaldehyde resin, a melamine-formaldehyde resin, an urea-formaldehyde resin, an epoxide resin, a polyester or a vinylester resin, or an alkyd resin, or to place in the hollow portions of the corrugated pipe wicks consisting of a mixture of reinforcing fibers and fusible thermoplastic fibers or reinforcing fibers filled with a fusible thermoplastic resin powder, then, after winding, to carry out a thermal treatment allowing to obtain the melting of the thermoplast before performing the cooling which provides the hardening of the assembly.

It is also possible to heat the wick comprising reinforcing fibers and the fusible resin, for example by means of a torch, just before the placing point in order to melt the resin just before depositing the impregnated wick. The later thermal treatment is then useless. The circumferential reinforcement being discontinuous in the axial direction of the tank, and being not linked to the longitudinal reinforcement, it avoids microcracking phenomena.

Using composites with a thermoplastic matrix in all the processes described above may afford the advantage of suppressing the additional stabilizing operation after the winding, since this stabilization can be achieved by cooling during the winding.

Any corrugated pipe exhibiting the features allowing implementation of the process can be used without departing from the scope of the invention.

The man skilled in the art will be able to conceive, from the description which has been given by way of illustration and in a non limitative way, various variants and modifications which will not depart from the scope of this invention.

I claim:

1. A process for manufacturing a reinforced metallic tank, the process comprising the steps of:

providing a thermoplastic substantially cylindrical corrugated pipe of a length corresponding to a length of the reinforced metallic tank to be manufactured, circumferentially reinforcing said corrugated pipe by filling a fiber-reinforced resin into each outer corrugation of said corrugated pipe and then stabilizing and solidifying said resin, thereby forming an armored corrugated pipe, placing one of a cylindrically hemispherical and a cylindrically ellipsoidal metallic tank having at least one end opening, and also having a cylindrical zone with a length and a diameter corresponding, respectively, to the length and a diameter of said armored corrugated pipe inside the armored corrugated pipe, thereby forming an assembly, depositing a longitudinal reinforcement directly on an exterior of each of the armored corrugated pipe and the metallic tank except in areas immediately adjacent said at least one end opening of the metallic tank, and subjecting said tank to internal pressure, thereby plastically deforming said metallic tank into each inner corrugation of said armored corrugated pipe without deforming either of said fiber-reinforcing resin and said longitudinal reinforcement, so that the metallic tank in the cylindrical zone becomes corrugated.

2. The process as claimed in claim 1, wherein the material of the metallic tank is a steel material with a high plastic elongation.

3. The process as claimed in claim 1, wherein the resin is a photocurable resin and wherein stabilizing said resin includes exposing said assembly to ultraviolet radiation.

4. The process as claimed in claim 1, wherein the resin is a heat convertible resin and wherein stabilizing said resin includes cross-linking the resin.

5. The process as claimed in claim 1, wherein the resin is a thermosetting resin and stabilizing the resin includes heating said resin.

6. The process as claimed in claim 1, wherein the longitudinal reinforcement includes an aramid wick impregnated with a thermoplastic elastomer, and said depositing step includes gluing a first end of the aramid wick to one end of the tank, winding the aramid wick around a cylindrical portion of the armored corrugated pipe and then gluing a second end of the aramid wick to a second end of the tank.

7. The process as claimed in claim 6, including stabilizing said fiber-reinforced resin simultaneously with said winding of said aramid wick.

8. The process as claimed in claim 1, including, prior to said depositing step, covering the armored corrugated pipe with a sheath made of a material substantially non-permeable to said fiber-reinforced resin, thereby holding the fiber-reinforced resin substantially in place in said outer corrugations.

9. The process as claimed in claim 1, including equipping at least one end of the tank with a system that provides one of communication with the outside and a tight closing.

10. The process as claimed in claim 1, further comprising the step of placing the assembly in a protective jacket.

* * * * *